United States Patent
Niemeyer et al.

(10) Patent No.: US 10,850,228 B2
(45) Date of Patent: Dec. 1, 2020

(54) FLOW-OPTIMIZED DESICCANT CARTRIDGE

(71) Applicants: MANN+HUMMEL GmbH, Ludwigsburg (DE); WABCO GmbH, Hannover (DE)

(72) Inventors: Stephan Niemeyer, Steinheim (DE); Peter Bauditsch, Boennigheim (DE); Kevin Pendzich, Hannover (DE); Marco Friedrich, Hannover (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 308 days.

(21) Appl. No.: 15/913,011

(22) Filed: Mar. 6, 2018

(65) Prior Publication Data

US 2018/0257025 A1    Sep. 13, 2018

(30) Foreign Application Priority Data

Mar. 8, 2017 (DE) .......................... 10 2017 002 120

(51) Int. Cl.
*B01D 53/02* (2006.01)
*B01D 53/26* (2006.01)
(Continued)

(52) U.S. Cl.
CPC ....... *B01D 53/261* (2013.01); *B01D 39/2017* (2013.01); *B01D 45/08* (2013.01);
(Continued)

(58) Field of Classification Search
CPC ...... B01D 2239/0618; B01D 2257/702; B01D 2257/80; B01D 2259/4566;
(Continued)

(56) References Cited

U.S. PATENT DOCUMENTS 4,487,617 A * 12/1984 Dienes ............... B01D 53/0431
55/DIG. 17
4,786,298 A * 11/1988 Billiet ................ B01D 46/0012
55/498
(Continued)

FOREIGN PATENT DOCUMENTS

DE       10051471 A1    4/2002
EP        1839728 A1   10/2007

*Primary Examiner* — Christopher P Jones
(74) *Attorney, Agent, or Firm* — James Hasselbeck

(57) ABSTRACT

Disclosed is a desiccant cartridge (10) for drying and de-oiling a gaseous fluid, and a method for flow guidance within the desiccant cartridge. The desiccant cartridge and a housing (12) having positioned therein an inner pot (28) in which an oil separating medium (50) for oil particles contained in the fluid and a desiccant (52) for drying the gaseous fluid are arranged one after the other in the direction of the housing longitudinal axis (14). The housing (12) has a housing base (18) having a centrally arranged inlet (20) for the fluid to be dried and de-oiled and having eccentrically arranged outlet openings (24) for the dried and de-oiled fluid. During normal operation of the desiccant cartridge (10), the gaseous fluid guided into the desiccant cartridge (10) via the central inlet (20) is first guided in a flow through the oil separating medium (50) and then through the desiccant (52).

7 Claims, 3 Drawing Sheets

(51) Int. Cl.
*B01D 45/08* (2006.01)
*B01D 46/00* (2006.01)
*B01D 39/20* (2006.01)
*B01D 53/04* (2006.01)
*B60T 17/00* (2006.01)
*B01D 50/00* (2006.01)
*B01D 46/24* (2006.01)

(52) U.S. Cl.
CPC ....... *B01D 46/003* (2013.01); *B01D 46/0005* (2013.01); *B01D 46/0036* (2013.01); *B01D 46/0043* (2013.01); *B01D 46/2411* (2013.01); *B01D 46/2414* (2013.01); *B01D 50/002* (2013.01); *B01D 53/0415* (2013.01); *B01D 53/0446* (2013.01); *B60T 17/004* (2013.01); B01D 2239/0618 (2013.01); B01D 2257/702 (2013.01); B01D 2257/80 (2013.01); B01D 2259/4566 (2013.01); B01D 2265/024 (2013.01)

(58) Field of Classification Search
CPC .............. B01D 46/0005; B01D 46/003; B01D 46/0036; B01D 46/0043; B01D 46/2411; B01D 46/2414; B01D 53/0415; B01D 53/0446; B01D 53/261; B60T 17/004
See application file for complete search history.

(56) References Cited

U.S. PATENT DOCUMENTS

| | | | | |
|---|---|---|---|---|
| 5,002,593 | A | * 3/1991 | Ichishita | B60T 17/004 96/137 |
| 5,427,609 | A | * 6/1995 | Zoglman | B01D 53/0415 95/98 |
| 2005/0188848 | A1 | * 9/2005 | Salzman | B01D 45/08 96/134 |
| 2009/0193977 | A1 | * 8/2009 | Hilberer | B60T 17/004 96/137 |
| 2012/0255437 | A1 | 10/2012 | Fornof et al. | |
| 2015/0258492 | A1 | * 9/2015 | Nishihara | B01D 53/261 96/118 |
| 2016/0325224 | A1 | * 11/2016 | Matsuie | B03C 3/28 |

* cited by examiner

10,850,228 B2

FLOW-OPTIMIZED DESICCANT CARTRIDGE

CROSS-REFERENCE TO RELATED APPLICATION

This application claims foreign priority under 35 U.S.C. 119 to prior filed German patent application No. 10 2017 002 120.1, filed 8 Mar. 2017, the entire contents of the aforesaid German patent application being incorporated herein by reference.

TECHNICAL FIELD

The invention relates to a desiccant cartridge and to a system for drying and de-oiling a gaseous fluid flow and to a method for flow guidance in such a desiccant cartridge.

BACKGROUND

Desiccant cartridges are used, for instance, in systems for drying and de-oiling air of pneumatic brake systems in utility vehicles. The compressed air is used, on the one hand, for controlling the brake system and, on the other hand, for attaining braking action and for releasing the parking brake. The compressed air must be free of humidity and oil residues, since, first of all, humid air in the compressed air brake system can lead to functional limitations because the water contained in the air can lead to corrosion and/or freeze in the winter and negatively affect the functioning of the compressed air system. In addition, at high operating temperatures, oil constituents contained in the compressed air may be converted to aggressive compounds that can damage seals and lubricating films for system components, for example pistons and valves. As a rule, the desiccant cartridges are provided for continuous mounting on a connecting head of the compressed air system and to this end have a housing base with an inlet for the gaseous fluid to be filtered and with an outlet for the filtered gaseous fluid. The desiccant cartridges are thus oriented with their longitudinal housing axis vertical or essentially vertical for operational use and should be arranged with the housing base oriented downward. Such a desiccant cartridge is known, for instance, from EP 1 839 728 B1. For desorption and regeneration of the desiccant and for removing oil collected by the oil separating medium, dried air is conducted through the desiccant and oil separating medium in the reverse direction at specific intervals. With the known desiccant cartridge, oil constituents from the oil separation medium may be added to the desiccant, which is not desired during normal operation, i.e., during drying and de-oiling of the unfiltered gaseous fluid, as well as during regeneration of the desiccant cartridge. The service life of the desiccant cartridge is reduced unnecessarily because of this.

Furthermore, known from DE 100 51 471 A1 is a desiccant cartridge in which the desiccant is provided upstream of an oil separator.

SUMMARY OF THE INVENTION

It is therefore the object of the invention to provide an aforesaid desiccant cartridge, as well as a system for drying and de-oiling a gaseous fluid, in particular for the air brake system of a utility vehicle, which desiccant cartridge and system have an overall improved service life. It is moreover the object of the invention to provide an improved method for flow guidance of a gaseous fluid in such a desiccant cartridge.

The inventive desiccant cartridge for drying and de-oiling a gaseous fluid comprises a housing having an inner pot that is positioned therein and in which an oil separating medium for oil particles contained in the fluid and a desiccant for drying the gaseous fluid are arranged one after the other in the direction of the longitudinal housing axis. During operation, the longitudinal housing axis is to be arranged oriented vertically or essentially vertically. The housing has a housing base having a centrally arranged inlet for the fluid to be dried and de-oiled and having outlet openings for the dried and de-oiled fluid, which outlet openings are arranged eccentrically with respect to the longitudinal housing axis and therefore the central inlet. During normal operation of the desiccant cartridge, the gaseous fluid guided into the desiccant cartridge via the central inlet is first guided in a flow through the oil separating medium and then through the desiccant. In the inventive desiccant cartridge, the desiccant is therefore fluidically downstream of the oil separating medium in the main flow direction of the gaseous fluid to be filtered and is arranged axially above the oil separating medium. In the inventive desiccant cartridge, therefore, the gaseous fluid is de-oiled before it is supplied in a flow to and passes through the desiccant. This avoids any oil-induced, and possibly irreversible, reduction in the drying performance of the desiccant. At the same time, oil separated in/at the oil separating medium is not able to penetrate passively at any time, i.e., due to gravity, into the desiccant and negatively affect the function of the latter. Moreover, an undesired addition of oil to the desiccant is prevented during regeneration of the desiccant cartridge, i.e., during the purge process for desorption of the desiccant. During the purge process, first the desiccant cartridge, which is under operating pressure, is deaerated via the inlet of the housing, which inlet is arranged centrally on the housing base, via a connecting base attached thereto. Together with the air still disposed in the desiccant cartridge, moisture (water) also separated in the desiccant and oil separated in the oil separating medium are expelled from the desiccant cartridge. Then preferably dry and de-oiled gaseous fluid, for instance from a compressed gas storage unit fluidically downstream of the desiccant cartridge, is introduced into the cartridge in a direction opposing the dry volume flow. The dry and preferably expanded gas regenerates the desiccant previously loaded with moisture. The purge fluid flow loaded with moisture is removed from the desiccant cartridge via the inlet arranged centrally on the housing base. The desiccant may be a moisture-absorbing silica gel in a manner known per se.

According to the invention, a deflector for fluid flowing into the desiccant cartridge is arranged between the inlet and the inner pot.

According to one refinement, it may be provided that the deflector has a curved or angled edge segment. Alternatively or in addition, the deflector may be arranged such that in terms of flow it is upstream of the oil separating medium so that there may be pre-separation due to the deflector.

According to one advantageous refinement of the invention, at least part of the oil separating medium is embodied as a coalescer medium. Because of this, small and extremely small oil droplets may be combined to create larger oil drops and may be retained in the oil separating medium and separated out of the gaseous fluid. The oil separating medium may be embodied in particular as a nonwoven. It is obvious that the latter may be arranged in a single layer or in multiple layers in the desiccant cartridge. It is particularly preferred that the nonwoven has glass fibers. Ready-made nonwovens may be obtained inexpensively commercially and have a high oil absorption capacity.

The desiccant cartridge preferably has a flow channel for the filtered gaseous fluid, which flow channel is immediately delimited radially by the housing and the inner pot. In this structural design of the desiccant cartridge, at least part of the flow channel is arranged annularly about the longitudinal axis of the housing or the inner pot arranged therein. The dried and de-oiled gaseous fluid flowing out of the desiccant thus flows over the inside housing wall. It is a positive secondary effect that this may be used for transmitting heat to the outside. To this end, the housing of the desiccant cartridge may advantageously comprise a material that conducts heat well, for instance aluminum or steel. Furthermore, an embodiment of the housing made of steel is advantageous for attaining high pressure resistance with a thin wall thickness; this permits the greatest possible desiccant volume to be housed in a given available space. In alternative embodiments, plastics may also be used instead of a metal material.

Particularly efficient oil separation may be attained in that the oil separating medium is connected to the inlet arranged centrally on the housing base via a supply channel that has a flow cross-section that expands axially up to the oil separating medium. Due to such a cross-sectional expansion, the flow speed of the gaseous medium may be reduced and the fluid and oil separating medium contact time relevant for the oil separation may be increased. Moreover, passage (penetration) of oil-containing gaseous fluid through the oil separating medium may be effectively countered.

Arranged between the inner pot and the housing may be a spring element through which the inner pot is axially stressed against a seal surface of the housing base. In this way it is possible to attain, with simple means, reliable sealing of the unfiltered-side flow guidance of the unfiltered gaseous fluid from the filtered-side of the desiccant cartridge. In particular an elastomer sealing element, a sealing ring, for instance, may be interposed between the inner pot and the sealing surface.

The inventive system for drying and de-oiling a gaseous fluid, in particular for the air brake system of a utility vehicle, comprises a connecting head having an input-side fluid connector to which a compressor is fluidically connected or attachable. The connecting head has an output-side fluid connector to which a pressure accumulator for dried and de-oiled gaseous fluid is fluidically connected or attachable. A desiccant cartridge as explained in the foregoing is connected using its inlet arranged centrally on the housing base to an outlet port of the connecting head. The outlet port of the connecting head is fluidically connected to the input-side fluid connector. The outlet openings of the desiccant cartridge arranged eccentrically on the housing base of the desiccant cartridge are fluidically connected to the outlet-side fluid outlet of the connecting head.

The inventive system has a simple structure and, due to the optimized flow guidance of the gaseous fluid to be de-oiled and dried, is characterized by an improved service life. In the same manner, lower maintenance operation and operation of the desiccant cartridge that is less susceptible to interruption may be attained using the inventive method for flow guidance of a gaseous fluid in an aforesaid desiccant cartridge, while at the same time attaining an improved service life or operating time for the desiccant cartridge.

DETAILED DESCRIPTION OF THE DRAWINGS

Figure 1:
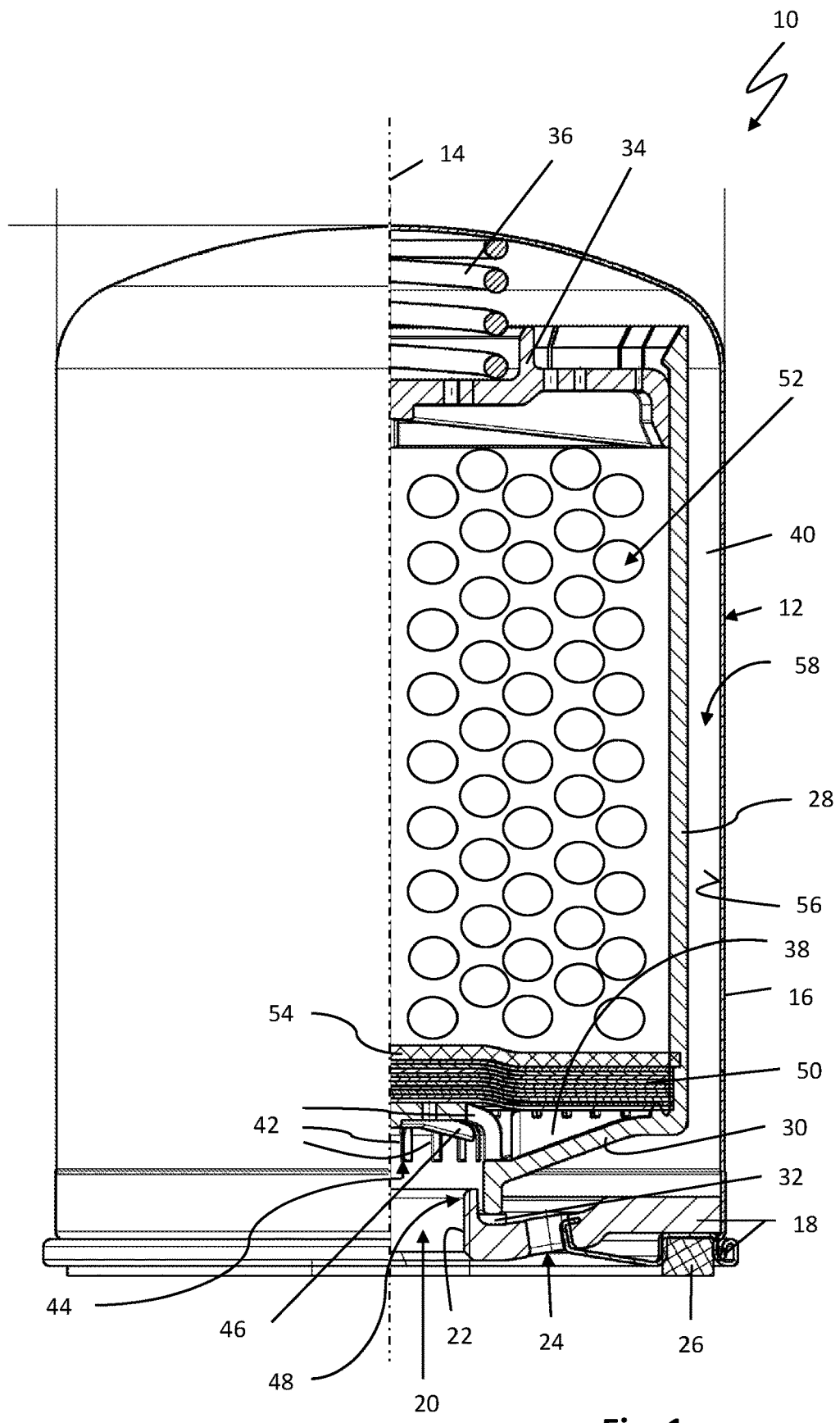
FIG. 1 is a partial longitudinal section of a desiccant cartridge for drying and de-oiling a gaseous fluid, having an inlet, for the gaseous fluid to be filtered, arranged centrally on the housing base.

FIG. 1 depicts a desiccant cartridge 10 in a partially sectional representation. The desiccant cartridge 10 has a housing 12 with a housing longitudinal axis 14. The housing 12 may be embodied rotationally symmetrical with the longitudinal housing axis 14. The housing 12 is constructed in two parts and has a housing pot 16 and a housing base 18 attached thereto. The housing pot 16 and the housing base 18 may be crimped to one another, as shown in FIG. 1, or may be glued, welded, and/or screwed to one another.

A centrally arranged inlet 20 for the gaseous fluid to be dried and de-oiled is arranged on the housing base 18. The inlet 20 is therefore arranged on the longitudinal housing axis 14. A thread 22 of the inlet 20 permits the desiccant cartridge 10 to be securely screwed to a connecting head, not shown in greater detail in FIG. 1, via which the gaseous fluid to be dried and de-oiled is supplied in a flow to the desiccant cartridge and via which the dried and de-oiled fluid flowing out of the desiccant cartridge is removed. The housing base 18 has a plurality of outlet openings 24, each of which is arranged eccentrically to the longitudinal housing axis 14. The outlet openings 24 are thus arranged offset radially outward relative to the inlet 20 and may in particular be arranged distanced from one another annularly about the longitudinal housing axis 14 in the circumferential direction of the desiccant cartridge 10. An annular sealing element 26 is arranged on the edge side on the housing base 18 in order to permit the desiccant cartridge 10 to be seated with a seal on the aforesaid connecting head.

An inner pot 28 is arranged inside the housing 12. The base segment 30 of the inner pot 28 is positioned sealingly over an elastomer sealing element 32, here a sealing ring, on the inside of the housing base 18. A windowed or interrupted cover 34 is arranged on the inner pot 28. Arranged between the cover 34 and housing is a spring element 36, in this case a compression spring, that is supported on the housing 12 on one end and on the cover 34 of the inner pot 28 at the other end. The spring element 36 is prestressed axially and presses the inner pot 28 axially towards and against the housing base 18. This attains a pressure and fluid-tight seal of the unfiltered side 38 of the desiccant cartridge 10 guiding the unfiltered fluid relative to the filtered side 40 of the desiccant cartridge 10 guiding the filtered (de-oiled and dried) fluid. The base segment 30 of the inner pot 28 has a plurality of inflow openings 42, slit-like in this case, for the gaseous fluid. The inflow openings 42 are arranged annularly and separated from one another about the longitudinal axis 14. A deflector 44 for the gaseous fluid that is to be filtered that is flowing in via the inlet 20 is arranged between the centrally arranged inlet 20 of the housing base 18 and the inflow openings 42. As shown in FIG. 1, the deflector 44 is annular having at least one inflow opening 30 extending through a circumferential wall of the deflector 44. The deflector 44 projects axially inwardly from inner side of the base of the inner pot 28. The deflector 44 covers the inlet 20 of the base segment 30 axially. For reasons of flow guidance, the deflector 44 has an edge section 46 angled or curved towards the housing base 18. The inner pot 28 and the housing 12 engage in one another in a base-side overlapping region 48. As shown in FIG. 1, the housing base 18 forms an annular projection (at 48 FIG. 1) projecting from an axial inner side of the housing base 18 into the interior of the housing 12, the annular projection forming a radially outer wall of the centrally arranged inlet opening 20. The an inner pot 28 has a base segment 30 which forms a second annular projection (at 48 FIG. 1) which projects axially outward from an axial outer side of the inner pot base segment 30, the second annular projection overlapping and engaging the annular projection of the housing base in the overlapping region 48. An oil separating medium 50 is arranged in the inner pot 28. The oil separating medium 50 is embodied as a coalescer medium and is present as glass fiber nonwoven.

A desiccant 52 for dynamic drying of the gaseous fluid is arranged towards the longitudinal housing axis 14 above the oil separating medium 50. The desiccant may in particular be silica gel, aluminosilicate (zeolite), aluminum oxide, calcium carbonate, or another suitable, regeneratable desiccant.

A separating layer 54 is arranged between the desiccant 52 and the oil separating medium 50 in order to prevent undesired penetration of the desiccant 52 into the oil separating medium 50. Since, during operation of the desiccant cartridge 10, the desiccant 52 is arranged above the oil separating medium 50, during operation and also outside of operation of the desiccant cartridge 10 no oil or essentially no oil is added to the desiccant 52 due to gravity. Excess oil can flow downward out of the oil separating medium 50 axially following gravity.

The inner pot 28 is arranged at a distance radially from the housing 12 or the inner housing wall 56, forming a sectionally annular flow channel 58 for the dried and de-oiled gaseous fluid. The flow channel 58 is fluidically connected on the output side to the outlet openings 24 of the housing base 18 of the desiccant cartridge 10.

Figure 2:
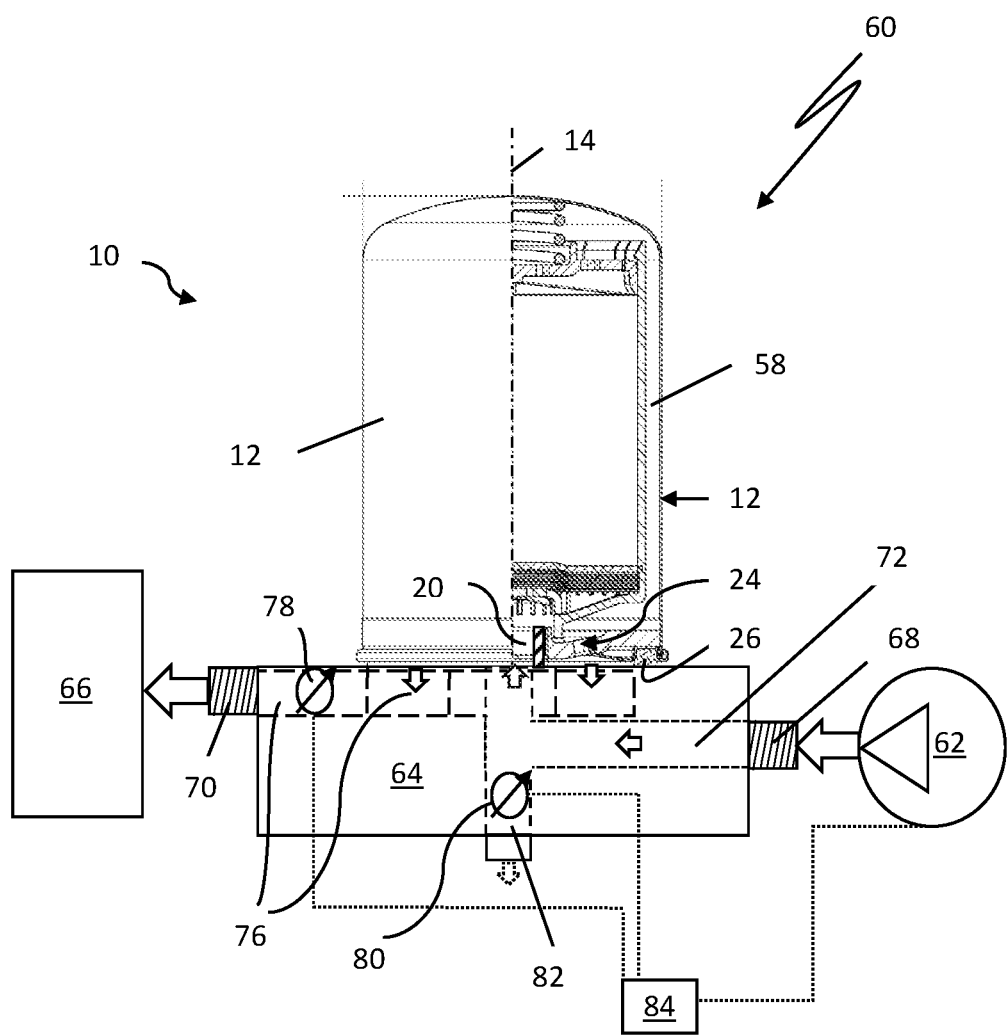
FIG. 2 is a partial sectional illustration of a system for drying and de-oiling a gaseous fluid having a connecting head and a desiccant cartridge, according to FIG. 1, connected to the connecting head, wherein the outlet port is connected to the central inlet of the desiccant cartridge; and, FIG. 3 is a flow chart having the individual method steps for flow guidance of a gaseous fluid to be dried and de-oiled in a desiccant cartridge according to FIG. 1.

FIG. 2 depicts a system 60 for drying and de-oiling a gaseous fluid, especially compressed air, such as is used in the air-brake system of a utility vehicle (not illustrated in greater detail in FIG. 2). By way of example, the system comprises a (compressed air) compressor 62, connecting head 64, a ready for use connected desiccant cartridge 10 according to FIG. 1 that is attached to the connecting head 64, and a pressure accumulator 66 for the dried and de-oiled gaseous fluid in the desiccant cartridge 10.

The connecting head 60 has one input-side and one output-side fluid connector 68, 70. The input-side fluid connector 68 is fluidically connected to the compressor 62, and the output-side fluid connector 70 is fluidically connected to the pressure accumulator. The input-side fluid connector 70 is connected to a connecting port 74 for the desiccant cartridge 10 via a first fluid channel 72. The desiccant cartridge 10 is screwed onto the connecting port 74 with the housing base 18 so that the connecting port 74 extends into the centrally arranged inlet 20 of the desiccant cartridge 10. The housing 12 is positioned sealingly against the outside of the connecting head 60 via the annular sealing element 26.

The outlet openings 24 of the desiccant cartridge 10 are fluidically connected, via a second fluid channel 76, to the output-side fluid connector 70 and therefore to the pressure accumulator 66 for the filtered gaseous fluid. A controllable two-way valve 78 may be associated with the second fluid channel. During the regeneration of the desiccant cartridge 10, performed at intervals, a discharge or blow-out channel 82 provided with a controllable one-way valve 80 discharges from the desiccant cartridge 10 a flow of regeneration fluid containing moisture and oil. A control device 84 controls the one-way valve, and, if present, the two-way valve 80.

Figure 3:
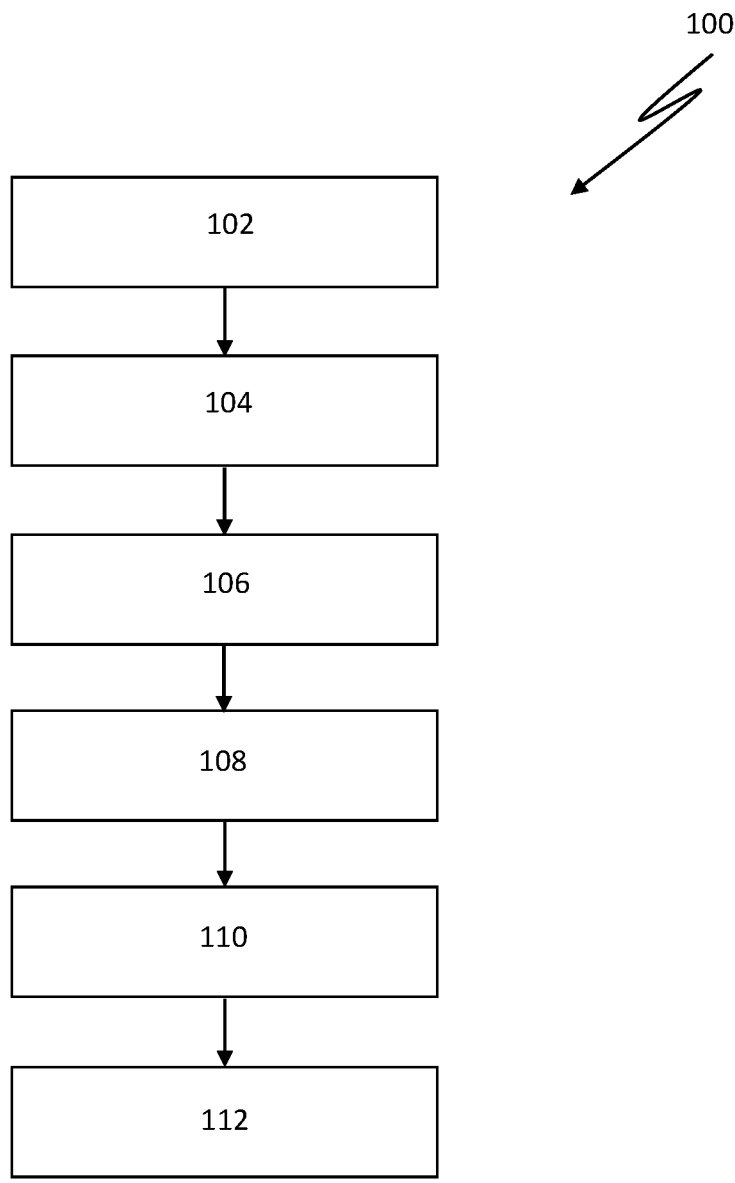

The gaseous fluid to be de-oiled and dried is conducted in a flow from the compressor 62 via the input-side connector 68 of the connecting head 64 and the first fluid channel 72 to the connecting port 74 of the connecting head 64. According to FIG. 3, the method for guiding the flow within the desiccant cartridge 10 that is employed during the drying and de-oiling of the gaseous fluid comprises a first step 102 in which the gaseous fluid to be de-oiled and dried is guided axially via the inlet 20 arranged centrally on the longitudinal housing axis 14 into the desiccant cartridge. In a subsequent step 104, the gaseous fluid to be filtered flows to the deflector 44 and is guided radially into the inner pot 28 via the inlet openings 42. In a subsequent step 106, the fluid is guided axially upward through the oil separating medium 50 arranged in the inner pot 28 and thus de-oiled. In a subsequent step 108, the de-oiled fluid is guided axially upward through the desiccant 52 arranged in the inner pot and thus dried. In a subsequent step 110, the dried and de-oiled gaseous fluid is guided out of the inner pot via the windowed cover and conducted radially to the outside. In a final step 112, the gaseous fluid is supplied axially between the inner pot 28 and the housing inner wall 56 axially into the outlet openings 24 arranged eccentrically on the housing base 18 and conducted via these out of the desiccant cartridge 10. The gaseous fluid flowing out of the desiccant cartridge 10 is supplied to the pressure accumulator 66 via the outlet-side fluid channel 76 and the outlet-side fluid connector 70 of the connecting head 64 and is then available for further use.

During the desorption or regeneration process, the gaseous fluid that is under pressure and arranged in the desiccant cartridge 10 and where necessary the dried and de-oiled gaseous fluid contained in the pressure accumulator 66 is released from the desiccant cartridge 20 by actuating the one-way valve 80 and where necessary the two-way valve 78, initially suddenly, via the central inlet 20 on the housing base 18. In doing so, oil contained in the oil separating medium 50 or absorbed on the oil separating medium is carried along by out-flowing fluid and discharged from the desiccant cartridge 10 via the central inlet 20. Undesired addition of oil to the desiccant is also reliably prevented in this flow reversal of the fluid. Then a dry and oil-free purge fluid flow from the pressure accumulator 66, conducted via the outlet openings 24 that are arranged eccentrically on the housing base 18 into the desiccant cartridge 10 flows through the desiccant cartridge 10 for a specified period of time, wherein moisture (water) breaks away from the desiccant and the latter is regenerated. The service life of the desiccant cartridge 10 may be extended due to the lack of oil being added to the desiccant 52 during normal operation of the desiccant cartridge 10 and during the regeneration of the latter.

What is claimed is:

1. A desiccant cartridge for drying and de-oiling a gaseous fluid, comprising
    a housing having a longitudinal housing axis arranged at a center of the housing, wherein axial, as used herein, is a direction defined by the longitudinal axis, and
wherein radial, as used herein, is a direction transverse to the longitudinal axis;
wherein the housing includes:
  housing pot surrounding the longitudinal axis, the housing pot having an interior and an open axial end;
  a housing base arranged on and closing off the open axial end of the housing pot, the housing base having:
    a centrally arranged inlet opening arranged on the longitudinal axis, receiving the fluid to be dried and de-oiled, the longitudinal axis extending through an interior of the centrally arranged inlet opening,
    wherein the housing base forms an annular projection projecting from an axial inner side of the housing base into the interior of the housing, the annular projection forming a radially outer wall of the centrally arranged inlet opening;
    at least one eccentrically arranged outlet opening for discharge of the dried and de-oiled fluid;
an inner pot arranged within the interior of the housing, the inner pot having
  an inner pot base arranged on an axial end of the inner pot facing the axial inner side of the housing base, the inner pot base forming a second annular projection which projects axially outward from an axial outer side of the inner pot base, the second annular projection overlapping and engaging the annular projection of the housing base;
an oil separating medium of nonwoven fibers arranged within an interior of the inner pot, the oil separating medium for oil particles contained in the fluid; and
a desiccant arranged in the interior of the inner pot, the desiccant for drying the gaseous fluid;
wherein the oil separating medium and the desiccant are arranged one after the other in a direction of the longitudinal housing axis;
wherein during normal operation of the desiccant cartridge, the gaseous fluid guided into the desiccant cartridge via the central inlet is first guided in a flow through the oil separating medium and then through the desiccant;
an annual deflector for deflecting fluid flowing into the desiccant cartridge, the annular deflector projecting axially inwardly from axial inner side of the inner pot base in the interior of the inner pot and covering the centrally arranged inlet opening of the housing base, the annular deflector having at least one inflow opening extending through a circumferential wall of the annular deflector.

2. The desiccant cartridge according to claim 1, wherein the annular deflector is upstream of the oil separating medium, relative to direction of fluid flow,
wherein the oil separating medium rests against the annular deflector, and
the annular deflector has a curved or angled edge segment for deflecting flowing fluid.

3. The desiccant cartridge according to claim 1, wherein the oil separating medium is a glass fiber nonwoven.

4. The desiccant cartridge according to claim 1, wherein an annular flow channel carrying the dried and de-oiled gaseous fluid to the at least one outlet opening, the annular flow channel formed by an annular gap between and delimited by a housing inner wall and the inner pot.

5. The desiccant cartridge according to claim 1, further comprising:
  a spring element arranged between the inner pot and the housing, the spring element generating an axial force, the axial force moving the inner pot to a sealing position and axially pre-stressing the inner pot against the housing base.

6. A system for drying and de-oiling a gaseous fluid of an air brake system of a utility vehicle, comprising:
  a connecting head having an input-side fluid connector to which a compressor is fluidically connected;
  an output-side fluid connector to which a pressure accumulator for dried and de-oiled gaseous fluid is fluidically connected; and
  a desiccant cartridge according to claim 1;
  wherein the desiccant cartridge inlet is arranged centrally on the housing base;
  wherein the desiccant cartridge is connected via a connecting port of the connecting head to the input-side fluid connector; and
  wherein the at least one outlet opening of the desiccant cartridge arranged eccentrically on the housing base of the desiccant cartridge are fluidically connected to the output-side fluid outlet of the connecting head.

7. A method for flow guidance of a gaseous fluid in a desiccant cartridge, according to claim 4, for drying and de-oiling the a gaseous fluid, comprising the steps of:
  feeding the gaseous fluid to be dried and de-oiled into the desiccant cartridge via the inlet opening arranged centrally on the housing base;
  de-oiling the gaseous fluid by guiding the gaseous fluid in an axial direction relative to the longitudinal housing axis, flowing axially through the oil separating medium arranged in the inner pot;
  drying the de-oiled gaseous fluid by guiding the flow in the axial direction through the desiccant arranged in the inner pot;
  discharging the dried and de-oiled gaseous fluid through the annular flow channel between the inner pot and the housing inner wall of the housing to the at least one outlet opening arranged eccentrically on the housing base and conducted via the outlet openings out of the desiccant cartridge.

* * * * *